United States Patent
Kumazawa et al.

(10) Patent No.: US 7,411,748 B2
(45) Date of Patent: Aug. 12, 2008

(54) OPTICAL COMPONENT UNIT, LASER JOINING METHOD AND APPARATUS FOR JOINING OPTICAL COMPONENT

(75) Inventors: Seiji Kumazawa, Kadoma (JP); Yohei Takechi, Hirakata (JP); Masahiro Kuwabara, Moriguchi (JP); Toshiyuki Okada, Toyonaka (JP); Masami Ito, Moriguchi (JP); Koji Funami, Kyoto (JP); Yosuke Kawahito, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 395 days.

(21) Appl. No.: 11/098,435

(22) Filed: Apr. 5, 2005

(65) Prior Publication Data

US 2006/0043622 A1    Mar. 2, 2006

(30) Foreign Application Priority Data

Apr. 7, 2004  (JP)  ............... 2004-112612
Apr. 7, 2004  (JP)  ............... 2004-112613

(51) Int. Cl.
*G02B 7/02*        (2006.01)
*B29D 11/00*      (2006.01)

(52) U.S. Cl. ...................................... 359/819; 264/1.1
(58) Field of Classification Search ......... 359/819–823; 264/1.9, 2.5, 1.1
See application file for complete search history.

(56) References Cited

U.S. PATENT DOCUMENTS 6,112,967 A * 9/2000 Ostendarp et al. .......... 225/93.5
6,989,932 B2 * 1/2006 Cho et al. ................... 359/619

FOREIGN PATENT DOCUMENTS

JP        2004-333946        11/2004

* cited by examiner

*Primary Examiner*—Mohammed Hasan
(74) *Attorney, Agent, or Firm*—Wenderoth, Lind & Ponack, L.L.P.

(57) ABSTRACT

A ratio of a length of resin flow-in to a radius of an optical component is not larger than 0.25, and gas is blown directly against a laser irradiated part radially and diagonally downward from an upside position corresponding to a center of the optical component. A laser line beam having longer sides extending in a direction along an inner wall is cast by a laser radiation device while being moved in the direction of the longer sides.

11 Claims, 13 Drawing Sheets

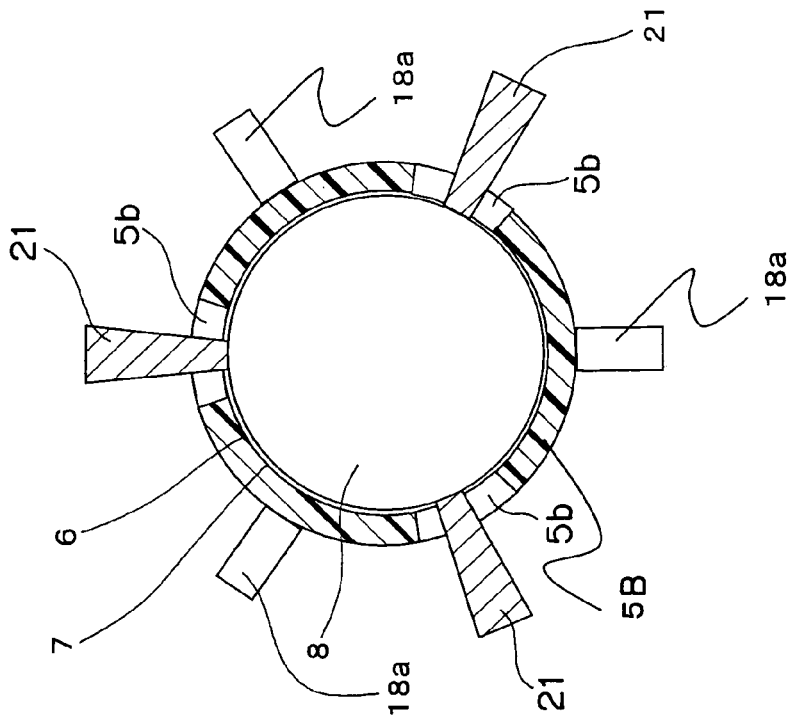
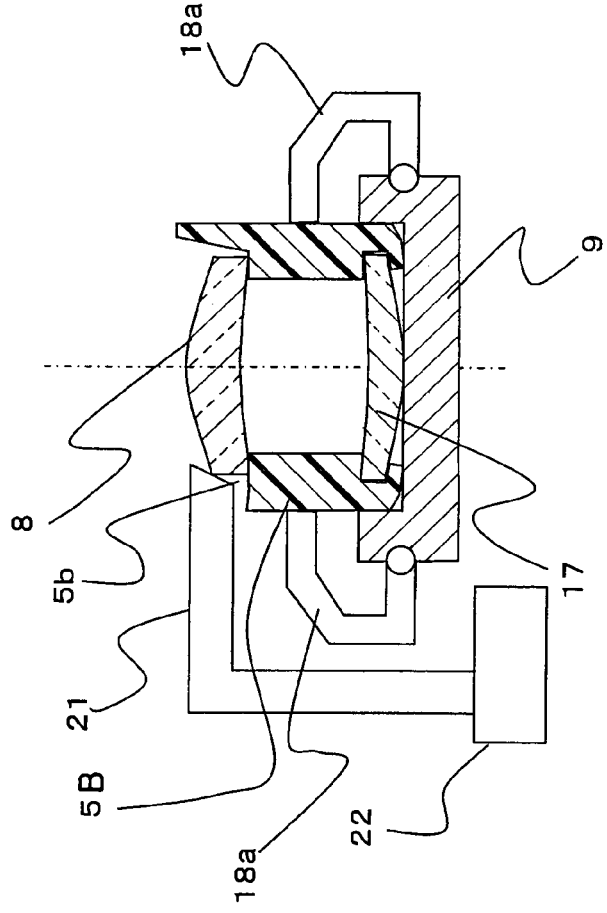

*Fig.3B*

| HEIGHT OF JETTING (mm) | JET DIAMETER (mm) | TOTAL AIR FLOW RATE (l/min) | RATIO OF RESIN FLOW LENGTH TO RADIUS (L/r) |
|---|---|---|---|
| 0 | 5 | 50 | 0.04 |
| 1 | 5 | 50 | 0.19 |
| 2 | 5 | 50 | 0.32 |
| -1 | 5 | 50 | 0.21 |
| -2 | 5 | 50 | 0.38 |
| 0 | 7 | 50 | 0.23 |
| 0 | 9 | 50 | 0.35 |
| 0 | 3 | 50 | 0.25 |
| 0 | 1 | 50 | 0.46 |
| 0 | 5 | 25 | 0.25 |
| 0 | 5 | 10 | 0.42 |

OPTICAL COMPONENT UNIT, LASER JOINING METHOD AND APPARATUS FOR JOINING OPTICAL COMPONENT

BACKGROUND OF THE INVENTION

1. Technical Field

The present invention relates to an optical component unit having an optical component housed along an inner wall of a housing component made of resin, and a laser joining method and apparatus for fixing the optical component to the inner wall.

2. Description of the Related Art

Among conventional methods for fixing optical components to a housing component made of thermoplastic resin is a method using thermal fastening in which the optical components are fixed to the housing component by provision of an interference in a mechanism for enclosing the optical components in the housing component, fixation of the housing component to a receiver jig, and deformation of the interference with heat and pressure exerted by what is called an anvil. Alternatively, there has been known a fixation method in which the optical components are bonded to the housing component with the use of ultraviolet curable adhesive.

In general, the fixation method using thermal fastening is often employed when accuracy is not so required, and the fixation method using ultraviolet curable adhesive is often employed when accuracy is required.

The optical components fixation method using thermal fastening achieves a high fixation strength and yet causes an issue in which a position accuracy for the optical components cannot be ensured. The fixation method using ultraviolet curable adhesive achieves the position accuracy and yet causes an issue in which a high fixation strength cannot be obtained. Additionally, the fixation in which the position accuracy is obtained requires ultraviolet irradiation time to be prolonged and thus causes an issue of a decrease in productivity.

Recently, a method has been proposed in which an optical component is fixed by casting a laser beam onto an inner wall of a housing component and forcing thermally melted resin between the inner wall and the optical component (Japanese Unexamined Patent Publication No. 2004-333946). It is contemplated that fixation of the optical component with high accuracy can be performed in a short tact time of several seconds in accordance with the method. Furthermore achieved are a reduction in rising time on the occasion of switching of types of machine and an improvement in productivity.

In the aforementioned fixation method with the casting of a laser beam onto the inner wall of the housing component, however, inert gas is fed solely so as to flow from the center toward the end of the optical component. Therefore, resin thermally melted into a viscous fluid state flows onto the outer periphery of the optical component, enters inside of an effective diameter of the optical component, then cools to become solid resin upon suspension of the laser radiation, and results in a decrease in the effective area of the optical component. A ratio of a length of the resin flow-in from the end face of the optical component to a radius of the optical component is larger than 0.25, and this makes it impossible to attain reduction in size and weight of the optical component unit. Besides, a portion of the resin, which is to be forced into a location between the inner wall of the housing component and the optical component for fixation of the optical component, flows onto the upper part of the optical component and thus, decreases the strength of fixation of the optical component, and there is a danger that the optical component will come off during service conditions including vibration, a fall, or the like.

On the condition that a laser beam with a spot diameter of $\phi$ 0.6 mm, 0.6 mm by 20 mm, or the like disclosed in Japanese Unexamined Patent Publication No. 2004-333946 described above is cast onto the inner wall, swelling of melted resin from the inner wall that is caused by the laser radiation exceeds 0.2 mm in a small-size optical component unit of which a height from a top of a wall surface of the optical component to a top of the inner wall of the housing component is not larger than 1 mm. This is because the laser beam having the width of 0.6 mm causes melting of the resin to extend to surroundings of the width by reason of heat conduction and causes an upper surface of the inner wall to be melted and solidified. Though a decrease in the power of the radiation may prevent the swelling from occurring, a decrease in the amount of the resin that is forced between the inner wall and the optical component for fixation of the optical component results in failure of the fixation or extremely low fixation strength. Products using optical component units in recent years have a notable inclination toward a decrease in size and thickness, and optical component units having a height of the inner wall lower than 1 mm and having no swelling are desired. Thus, the occurrence of the swelling on the upper surface of the inner wall prevents the desired decrease in size and thickness of the product.

Use of such a laser may melt a receiving surface that holds the optical component. When the laser beam is cast onto a portion of the optical component in the vicinity of the inner wall, a traveling direction of the laser beam changes because of a difference in refractive index, so that the laser beam is cast onto the receiving surface that holds the optical component. In this situation, the receiving surface is melted and swells up, and an interval is changed between surfaces of the optical component and another optical component, and thus performance as the optical component unit is deteriorated.

It is an object of the present invention to provide an optical component unit, and a laser joining method and apparatus for optical component each of which allows an effective diameter of an optical component to be increased with a ratio of a length of resin flow-in to a radius of the optical component being not larger than 0.25, which can be decreased in size and thickness by prevention of swelling of an inner wall, and in which evenness on a receiving surface of a housing component prevents deterioration in the performance of the optical component.

SUMMARY OF THE INVENTION

For accomplishing the above object, the present invention is configured as follows.

According to a first aspect of the present invention, there is provided an optical component unit comprising:

a housing component formed of resin; and an optical component housed along an inner wall of the housing component, the inner wall of the housing component having traces of laser irradiation, the traces of laser irradiation being formed from resin of the inner wall melted locally and thermally in a viscous fluid state and forced into and fixed between the optical component and the inner wall, a ratio of a length of resin flow-in from an end face of the optical component on an outer upper surface of the optical component to a radius of the optical component being larger than 0 and not larger than 0.25.

According to a second aspect of the present invention, there is provided an optical component unit as defined in the first aspect, wherein a height from a top of a wall surface of the optical component to a top of the inner wall of the housing component is not larger than 1 mm and wherein swelling of melted resin from the inner wall is not larger than 0.2 mm.

According to a third aspect of the present invention, there is provided an optical component unit as defined in the first or second aspect, wherein a receiving surface of the housing component for holding the optical component has no traces of melt.

According to a fourth aspect of the present invention, there is provided a laser joining method for optical component unit, the method comprising:

casting laser by a laser radiation device onto an inner wall of a housing component formed of resin, locally and thermally melting resin of a laser irradiated part into the viscous fluid state, forcing the resin in the viscous fluid state into between the optical component housed along the inner wall of the housing component and the inner wall, blowing directly against the laser irradiated part gas jetted radially and diagonally downward from a position above a center of the optical component by a gas jet device, and cooling and solidifying the resin in the viscous fluid state forced into between the optical component and the inner wall.

According to a fifth aspect of the present invention, there is provided a laser joining method for optical component unit in which an optical component housed along an inner wall of a housing component formed of resin is fixed to the inner wall, the method comprising:

casting onto the inner wall a laser line beam having longer sides extending in a direction along the inner wall of the housing component formed of resin, by a laser radiation device, while moving the laser line beam in the direction of the longer sides, locally and thermally melting resin of a laser irradiated part into the viscous fluid state, and forcing the resin in the viscous fluid state into between the optical component housed along the inner wall of the housing component and the inner wall.

According to a sixth aspect of the present invention, there is provided a laser joining method for optical component unit as defined in the fifth aspect, wherein the laser line beam cast on the inner wall has a beam width not smaller than 20 μm and not larger than 300 μm.

According to a seventh aspect of the present invention, there is provided a laser joining apparatus for optical component unit, the laser joining apparatus comprising:

a holding member for holding a housing component that is formed of resin and that houses an optical component along an inner wall, a laser radiation device for casting laser onto the inner wall of the housing component, locally and thermally melting resin of a laser irradiated part into the viscous fluid state, and forcing the resin in the viscous fluid state into between the optical component and the inner wall so as to fix the optical component to the inner wall, and a gas jet device that is placed in a position above a center of the optical component, for jetting gas radially and diagonally downward from the position above the center of the optical component, and blowing the gas directly against the laser irradiated part.

According to an eighth aspect of the present invention, there is provided a laser joining apparatus for optical component unit as defined in the seventh aspect, wherein a nozzle unit of the gas jet device has a ring-like gas jet nozzle directed toward the laser irradiated part.

According to a ninth aspect of the present invention, there is provided a laser joining apparatus for optical component unit as defined in the seventh aspect, the laser joining apparatus comprising a plurality of the laser radiation devices, wherein a nozzle unit in the gas jet device has gas jet nozzles directed toward the laser irradiated part, as many as the laser radiation devices, and wherein the laser joining apparatus further comprises a turning mechanism for turning the nozzle unit simultaneously with the laser radiation devices.

According to a 10th aspect of the present invention, there is provided a laser joining apparatus for optical component unit, the laser joining apparatus comprising:

a holding member for holding a housing component that is formed of resin and that houses an optical component along an inner wall and, a laser radiation device for casting onto the inner wall a laser line beam that has longer sides extending in a direction along the inner wall of the housing component and that has a beam width not smaller than 20 μm and not larger than 300 μm, while moving the laser line beam in the direction of the longer sides, locally and thermally melting resin of a laser irradiated part into the viscous fluid state, and forcing the resin in the viscous fluid state into between the optical component and the inner wall so as to fix the optical component to the inner wall.

In accordance with the present invention, an optical component unit can be provided in which optical components have high accuracies and high fixation strengths, which is excellent in productivity with a short process time for fixation, and which is small in size and thickness and exhibits high performance.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1E is an explanatory diagram partly in section illustrating a status in which a housing component of FIG. 6 is held through the chuck mechanism by the holding member in the first embodiment and in which a position of a convex lens in the housing component has been adjusted by lens position adjustment chucks;

FIG. 1F is a plan view partly in section illustrating a status in which the housing component of FIG. 6 is held through the chuck mechanism by the holding member in the first embodiment and in which the position of the convex lens in the housing component has been adjusted by lens position adjustment chucks;

FIG. 3B is a diagram showing a table for explaining lengths of flow-in of melted resin in the first embodiment;

DETAILED DESCRIPTION OF THE PREFERRED EMBODIMENTS

Figure 1A:
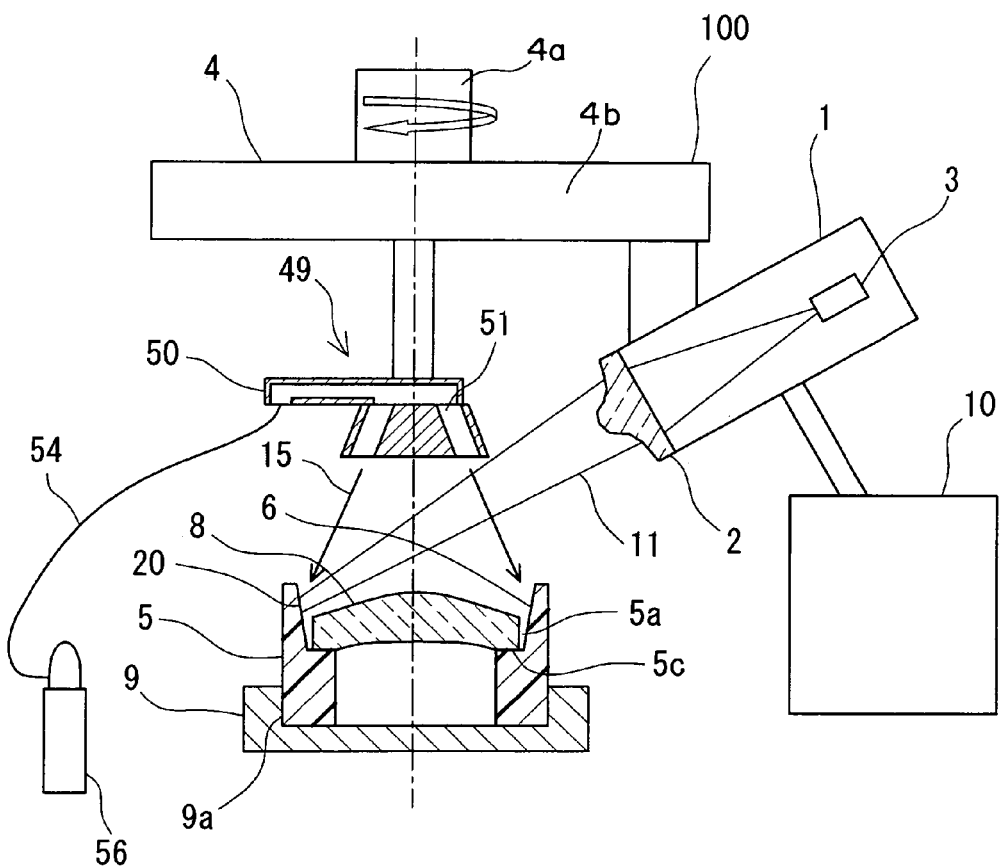
FIG. 1A is a schematic view partly in section illustrating a configuration of an optical component fixing apparatus as an example of a laser joining apparatus in accordance with a first embodiment of the present invention.

Before the description of the present invention proceeds, it is to be noted that like parts are designated by like reference numerals throughout the accompanying drawings.

Hereinbelow, embodiments of the present invention will be described in detail with reference to the accompanying drawings.

An optical component unit in accordance with a first embodiment of the present invention has a housing component formed of resin and an optical component housed along an inner wall of the housing component. The inner wall of the housing component has traces of laser irradiation, the traces of laser irradiation are so formed that the inner wall has been melted locally and thermally into resin in the viscous fluid state and the resin has been forced into and fixed between the optical component and the inner wall. Also, a ratio of a length of resin flow-in from an end face of the optical component on an outer upper surface of the optical component to a radius of the optical component is larger than 0 and not larger than 0.25.

Equipment in which optical component units are used is required to be decreased in thickness, size, and weight and, accordingly, optical component units themselves are also required to be decreased in thickness, size, and weight. In accordance with this configuration, there is a characteristic in that fixation can be performed with high accuracy and in a short process time as in the conventional apparatus, and a ratio (L/r) of a length L of resin flow-in from a circumferential end face toward a center of the optical component to a radius r of the optical component is larger than 0 and not larger than 0.25. Thus a large effective area of the optical component can be ensured without being interrupted by the resin, a smaller optical component can be used among optical components having the same effective area, and an optical component unit that is smaller in size and weight can be produced. Besides, resin that may flow onto an outer upper surface of the optical component flows into a gap between the optical component and the inner wall of the housing component, and a characteristic is therefore attained in that a contact area between the optical component and the resin which is larger than that in the conventional apparatus provides great strength of fixation of the optical component. Furthermore, the danger is reduced that the resin, which may flow onto the outer upper surface of the optical component and may partially peel off because of vibration generated by use of the equipment (such as a digital camera) in which the optical component is installed or the like, may enter onto the optical component or into a mechanical shutter, for example, placed right above the optical component unit, and may significantly deteriorate the performance of the optical component unit, and the appearance thereof is thus made preferable.

A height from a top of a wall surface of the optical component to a top of the inner wall of the housing component is preferably not larger than 1 mm and swelling of melted resin from the inner wall is preferably not larger than 0.2 mm.

For the purpose of reduction in the thickness of the optical component unit, it is important for the height from the top of the wall surface of the optical component to the top of the inner wall of the housing component to be not larger than 1 mm. Right above an optical component unit for a digital camera or the like may be placed other components such as a mechanical shutter. Accordingly, swelling of the inner wall that is caused by fixation of the optical component is preferably as small as 0.2 mm or smaller, and the absence of swelling is more preferable.

A receiving surface of the housing component for holding the optical component preferably has no traces of melted resin.

In the event that the receiving surface (surface 5c in FIG. 2A that will be described) in a recess of the housing component for holding the optical component is melted, a part of the melted portion swells up and is solidified as it is, so that a shape is made in which a part of the receiving surface swells. Then intervals of surfaces among other optical components such as a lens, a light receiving element, and the optical component vary and thus deteriorate performance of the optical component unit. The receiving surface for holding the optical component that has no traces of melt can avoid the above-mentioned defectiveness.

In a laser joining method for an optical component unit in accordance with the embodiment, the optical component housed along the inner wall of the housing component formed of resin is fixed to the inner wall. In a laser irradiation process, laser is cast onto the inner wall by a laser irradiation device, resin in the laser irradiated part is locally and thermally melted into the viscous fluid state, and the resin in the viscous fluid state is forced between the optical component and the inner wall. Gas jetted radially and diagonally downward from an upside position, corresponding to the center of the optical component, is blown directly against the laser irradiated part by a gas jet device.

In accordance with the configuration, the gas blown directly against the laser irradiated part flows from an upper part toward a lower part of the inner wall. Therefore, the resin melted into the viscous fluid state is restrained from flowing upward, and the melted resin is prevented from being lifted up to the upper part of the inner wall and flowing onto the outer upper surface of the optical component. The gas is blown directly against the laser irradiated part, and therefore the flow-in of the resin can be restrained by the gas blowing at a small flow rate. Provided that gas is not blown directly against the laser irradiated part, for example, provided that gas is blown against the center of the optical component so as to flow to a periphery of the optical component, there are caused a loss in flow rate according to a distance of the gas flow, difficulty in the control over the flow rate in the laser irradiated part, impossibility of control over the direction of the gas flow, and difficulty in stable restraint on the lift of the melted resin up to the upper part of the inner wall and on the flow of the melted resin onto the outer upper surface of the optical component and in control over temperature of the resin in the laser irradiated part. In addition, the flow rate of blown gas is increased, resulting in increased cost. Direct gas blow against the laser irradiated part facilitates control over the resin temperature, makes it possible to stabilize the amount of resin that flows between the optical component and the inner wall, and makes it possible to produce optical component units with stably high fixation strength and low cost. Besides, a period of time required for stabilization of the gas flow rate is decreased and the productivity is improved. On the condition that there is a difference in the distance from the center to the end of the optical component according to the types of machine, furthermore, reduction in rising time in switching of the machine types and improvement in productivity can be achieved simply by the provision of gas jet devices that make the distances from the inner wall to jet nozzles the same.

A laser joining method for an optical component in accordance with the embodiment is a laser joining method for an optical component unit in which the optical component housed along the inner wall of the housing component formed of resin is fixed to the inner wall. In the method, a laser line beam having longer sides extending in a direction along the inner wall is cast onto the inner wall by a laser irradiation device while being moved in the direction of the longer sides, resin in a laser irradiated part is locally and thermally melted into the viscous fluid state, and the resin in the viscous fluid state is forced into an area between the optical component and the inner wall.

In this process, shorter sides of the laser line beam conform to a direction perpendicular to the direction of the movement of the laser line beam, and traces of melt (width of melted part) are thus made small. Swelling of melted resin from the upper surface of the inner wall is not larger than 0.2 mm in the optical component unit of which a height from the top of the wall surface of the optical component to the top of the inner wall of the housing component is not larger than 1 mm. Thus, thin optical component units can be produced and interference with other components can be reduced. Furthermore, the receiving surface of the housing component that faces a bottom surface of the optical component is prevented from being irradiated with the laser line beam, deterioration in characteristics is prevented that is caused by variation in distance between optical components, and high accuracy and high fixation strength are obtained in fixation of optical components that require a fixation accuracy. For process time, a period of time required for thermal melting of the resin over a required length on the inner wall is saved by the movement of the laser line beam in the direction of the longer sides. In the method with irradiation of the laser line beam, the optical component can be fixed along the inner wall of the housing component without the use of dedicated jigs. As a result, rising time in switching of the types can be decreased.

The laser line beam cast on the inner wall preferably has a beam width not smaller than 20 µm and not larger than 300 µm.

This arrangement is effective when the laser line beam, having a laser power which ensures a sufficient fixation strength, is cast on the housing component of which a height from the optical component to the upper surface of the inner wall is 1 mm. Beam widths not smaller than 20 µm ensure a strength in melt of resin, and beam widths not larger than 300 µm make traces of melt (width of melted part) small, result in swelling of the traces of melt from the inner wall upper surface not larger than 0.2 mm, and thus reduce interference with other components. Besides, the receiving surface of the housing component that faces the bottom surface of the optical component is prevented from being irradiated with the laser, and deterioration in characteristics, caused by variation in the distance between the optical component and other optical components, is prevented.

A laser joining apparatus for optical component in accordance with the embodiment is a laser joining apparatus for an optical component unit which fixes to an inner wall an optical component housed along the inner wall of a housing component formed of resin. The laser joining apparatus has a holding member for holding the housing component that houses the optical component, a laser radiation device for casting laser onto the inner wall and locally and thermally melting resin in a laser irradiated part into the viscous fluid state, forcing the resin in the viscous fluid state between the optical component and the inner wall, and a gas jet device for blowing directly against the laser irradiated part gas jetted radially and diagonally downward from a nozzle unit placed in an upside position corresponding to the center of the optical component.

In accordance with this configuration, the gas flows diagonally downward from above the center of the optical component. Therefore, the resin melted into the viscous fluid state is restrained from flowing upward, and the melted resin is prevented from being lifted up to the upper part of the inner wall and flowing onto an outer upper surface of the optical component. The gas is blown directly against the laser irradiated part, and therefore the flow of the resin can be restrained by the gas at a small flow rate. The direct gas flow against the laser irradiated part facilitates control over the resin temperature, makes it possible to stabilize the amount of resin that flows between the optical component and the inner wall, and makes it possible to produce optical component units with stably high fixation strength and low cost. Besides, a period of time required for stabilization of the gas flow rate is decreased and productivity is improved. On the condition that there is a difference in distance from the center to ends of the optical component according to types of machine, furthermore, reduction in rising time in switching of the machine types and improvement in productivity can be achieved simply by the provision of gas jet devices that make distances from the inner wall to jet nozzles the same.

In the gas jet device, a nozzle unit thereof preferably has a ring-like jet nozzle directed toward the laser irradiated part.

Preferably, the nozzle unit in the gas jet device has gas jet nozzles directed toward the laser irradiated part, as many as the laser radiation devices, and the gas jet device has a mechanism in which the nozzle unit turns simultaneously with the laser radiation devices.

A laser joining apparatus for optical component in accordance with the embodiment is a laser joining apparatus for an optical component unit which fixes to an inner wall an optical component housed along the inner wall of a housing component formed of resin. The laser joining apparatus has a holding member for holding the housing component that houses the optical component, and laser radiation devices for casting laser line beams, having longer sides extending in a direction along the inner wall, onto the inner wall while moving the beams in the direction of the longer sides, so as to locally and thermally melt resin in a laser irradiated part into the viscous fluid state and so as to force the resin in the viscous fluid state between the optical component and the inner wall, with the devices having a beam width not smaller than 20 μm and not larger than 300 μm.

In accordance with such a configuration, shorter sides of the laser line beams conform to a direction perpendicular to the direction of the movement of the laser line beams. The beam width not smaller than 20 μm ensures a strength in melt of resin, and the beam width not larger than 300 μm makes traces of melt (width of melted part) small. Swelling of melted resin from an upper surface of the inner wall is not larger than 0.2 mm in an optical component unit of which a height from a top of a wall surface of the optical component to a top of the inner wall of the housing component is not larger than 1 mm. Thus, thin optical component units can be produced and interference with other components can be reduced. Furthermore, the receiving surface of the housing component that faces a bottom surface of the optical component is prevented from being irradiated with the laser line beams, deterioration in characteristics is prevented that is caused by variation in distance between optical components, and high accuracy and high fixation strength can be obtained in fixation of optical components that require a fixation accuracy. For process time, a period of time required for thermal melt of resin over a required length on the inner wall is saved by the movement of the laser line beams in the direction of the longer sides. In the method with radiation of the laser line beams, the optical component can be fixed along the inner wall of the housing component without the use of dedicated jigs. As a result, rising time in switching of machine types can be decreased.

Hereinbelow, the embodiments of the present invention will be described more specifically with reference to the drawings.

First Embodiment

FIG. 1A is a schematic view of an optical component fixing apparatus 100 as an example of a laser joining apparatus for an optical component unit in accordance with a first embodiment of the present invention, and the optical component fixing apparatus 100 has a holding member 9, a laser radiation device 1, and a gas jet device 49.

Figure 1B:
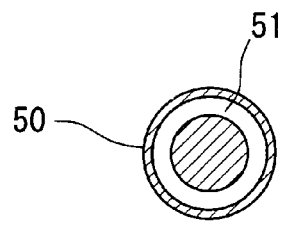
FIG. 1B is a bottom view of a nozzle unit of a gas jet device in the optical component fixing apparatus shown in the first embodiment.

The holding member 9 is a member for holding a cylindrical housing component 5 that is made of resin and that houses along an inner wall 6 a convex lens 8, as an example of an optical component, with a diameter of 10 mm and an effective diameter of 8.3 mm, and the holding member 9 holds the housing component 5 fit in a fitting recess 9a, for example. As shown in FIG. 1D, the holding member 9 may have a chuck mechanism 18 that has a plurality of chuck hooks 18a and can be opened and closed about swingably supported lower ends of the chuck hooks 18a as shown by arrows. Thus, the housing component 5 fit in the fitting recess 9a may be held in position more accurately with closure of the plurality of chuck hooks 18a of the chuck mechanism 18.

The housing member 5 is shaped like a cylinder in which a circular recess 5a having the inner wall 6 inclined so as to extend outward is formed in its upper part, and the housing component 5 is composed of thermoplastic resin, e.g., thermoplastic resin material in which carbon black is mixed with polycarbonate. A curved circumferential side surface of the convex lens 8 is held along the inner wall 6 of the circular recess formed in the housing component 5. The inner wall 6 is not limited to the wall that is inclined so as to extend outward as described above but may be a wall that extends along a direction of an optical axis without being inclined.

The laser radiation device 1 casts a laser beam 11 onto the inner wall 6 of the housing component 5, so that resin in a laser irradiated part 20 irradiated with the laser 11 is locally and thermally melted into the viscous fluid state. The resin in the viscous fluid state is forced into an area between the optical component 8 and the inner wall 6, and the optical component 8 is thus fixed to the inner wall 6. The laser radiation device 1 has a laser source 3. The laser source 3 casts onto the inner wall 6 the laser beam 11 with a wavelength of 810 nm, which is capable of melting resin constituting the inner wall 6 formed in the housing component 5 so that the resin is transformed into the viscous fluid state and which is capable of subjecting the resin to local decomposition.

A focusing optical system 2 is provided on the laser outgoing side of the laser source 3 of the laser radiation device 1. The focusing optical system 2 makes the laser beam 11, which has been emitted from the laser source 3, into a laser line beam traveling toward the inner wall 6 of the housing component 5 and having a beam width of 50 μm, and is preferably one aspheric lens in terms of reduction in size and weight. The focusing optical system 2 that is a combination of a plurality of convex lenses, concave lenses, or aspheric lenses presents no problem, as long as the optical system is capable of focusing into a beam having a beam width not smaller than 20 μm and not larger than 300 μm. The wavelength of the laser 11 is not limited to 810 nm but may be 910 nm.

The optical component fixing apparatus 100 further has a focusing optical system driving device 10. The focusing optical system driving device 10 swings the focusing optical system 2 in xyz directions (wherein xy directions are two directions orthogonal to each other, e.g., in a horizontal plane in a location in which the optical component fixing apparatus 100 is provided and wherein a vertical direction orthogonal to the two directions is defined as z direction) and thereby adjusts the position and inclination of the focusing optical system 2 so that the specified laser line beam can be cast onto the inner wall 6.

Figure 5:
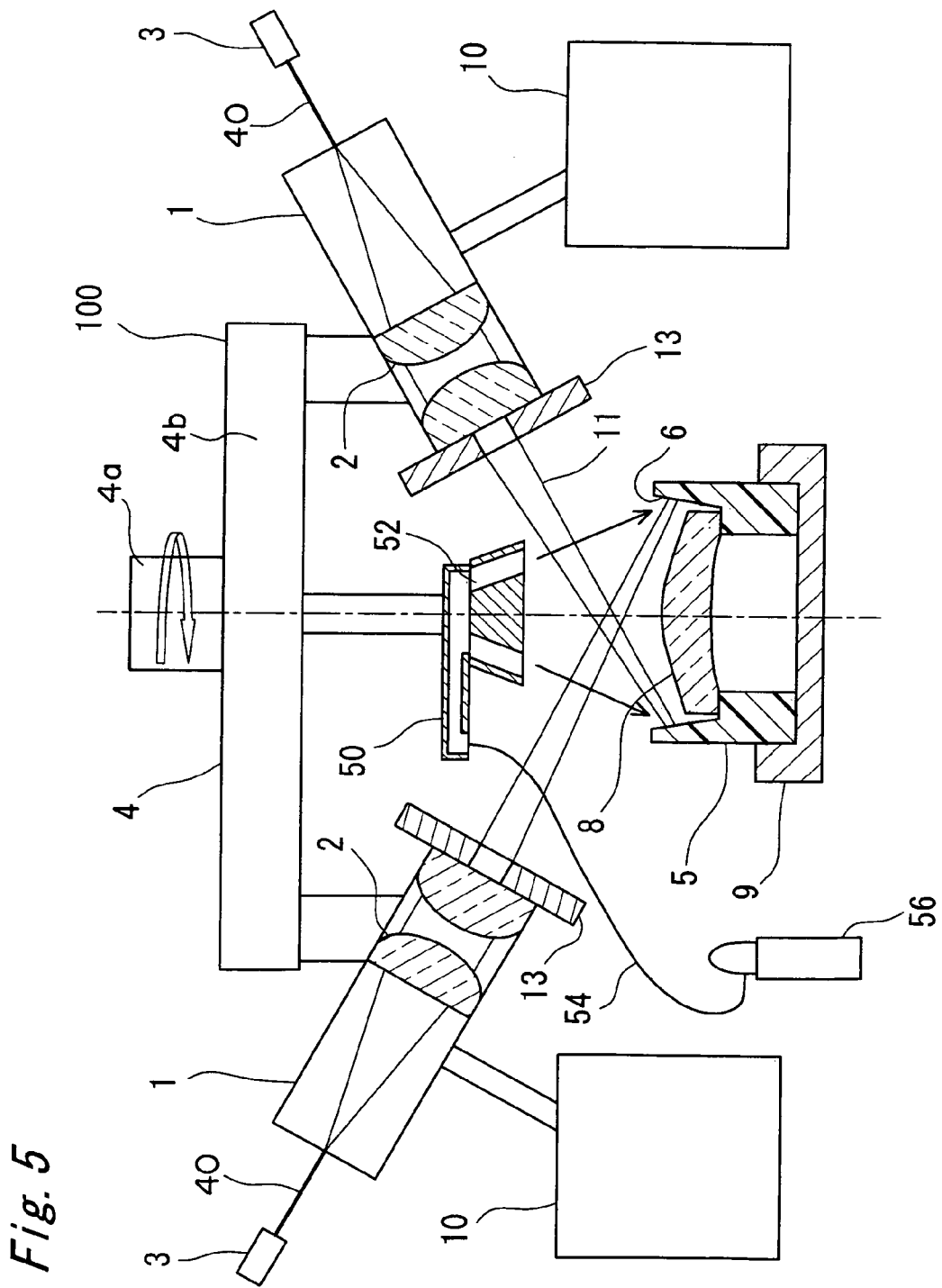
FIG. 5 is a schematic diagram illustrating a configuration of an optical component fixing apparatus of a laser joining apparatus in accordance with a fourth embodiment of the present invention.

The optical component fixing apparatus 100 is further provided with an irradiated position moving device 4. The irradiated position moving device 4 changes a position on the inner wall 6 on which the laser beam 11 impinges, so that the entire circumference of the convex lens 8 is irradiated with the laser 11 cast from the laser radiation source 3. The irradiated position moving device 4 is composed of a frame 4b for supporting the laser radiation device 1 (i.e., the laser radiation source 3, the focusing optical system 2, and the focusing optical system driving device 10) and a driving device 4a, such as a motor, for driving and turning the frame 4b. With the turning-drive of the driving device 4a, the laser radiation device 1 (i.e., the laser radiation source 3, the focusing optical system 2, and the focusing optical system driving device 10) supported by the frame 4b can be turned about an optical axis of the convex lens 8 along circumferential directions of the inner wall 6 of the housing component 5. As will be described later, the laser radiation source 3 is not required to be turned in an apparatus in which the laser radiation source 3 is placed outside the laser radiation device 1, as shown in FIG. 5, and in which the laser 11 from the laser radiation source 3 is introduced into the laser radiation device 1 through a fiber 40 connecting the laser radiation source 3 to the laser radiation device 1.

The gas jet device 49 is placed above the center of the optical component 8 and radially jets gas diagonally downward from the position above the center of the optical component 8 so as to blow the gas directly against the laser irradiated part 20. The gas jet device 49 is composed of a nozzle unit 50 which has a ring-like jet nozzle 51 directed toward the laser irradiated part 20 of the inner wall 6, a gas cylinder 56 in which gas is stored, and a gas feed pipe 54 which connects the nozzle unit 50 to the gas cylinder 56. As the gas jet device 49, any device can be used as long as the device has a mechanism for feeding gas to the nozzle unit 50.

The nozzle unit 50 is placed in a position that is on a center line (optical axis) of the convex lens 8, that does not interfere with the laser 11, and that is above the convex lens 8. The nozzle unit 50 has the ring-like jet nozzle 51 directed toward the laser irradiated part 20 of the inner wall 6 of the housing component 5 (see FIG. 1B). The nozzle unit 50 radially jets gas such as air diagonally downward from the jet nozzle 51 at a total flow rate of 50 liters per minute, and fulfils a function of blowing the air directly against the inner wall 6 that is irradiated with the laser 11.

Figure 2A:
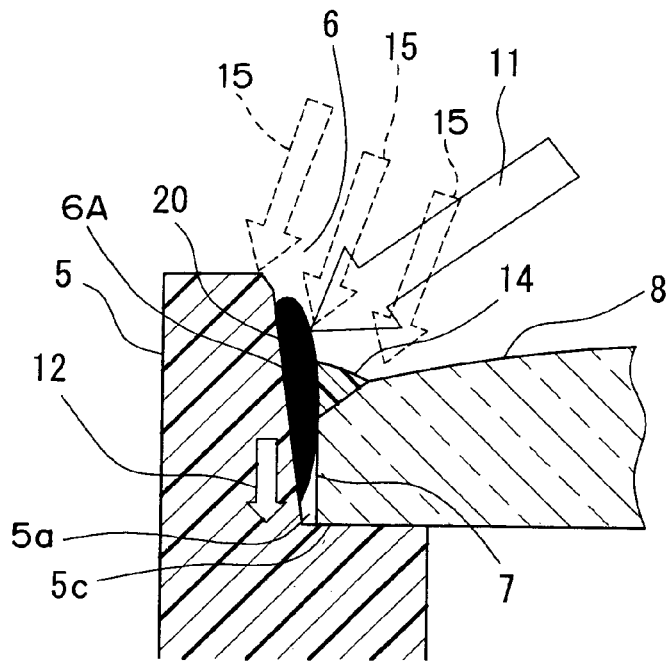
FIG. 2A is a sectional view for explaining a laser joining method in accordance with the first embodiment in which the optical component is fixed to an inner wall of the housing component by the optical component fixing apparatus.

Hereinbelow, the operation of the optical component fixing apparatus 100 having the above configuration will be described. FIG. 2A is a sectional view for explanation of a method of fixing the convex lens 8 to the inner wall 6 of the housing component 5 with the use of the optical component fixing apparatus 100 in accordance with the first embodiment.

Figure 1C:
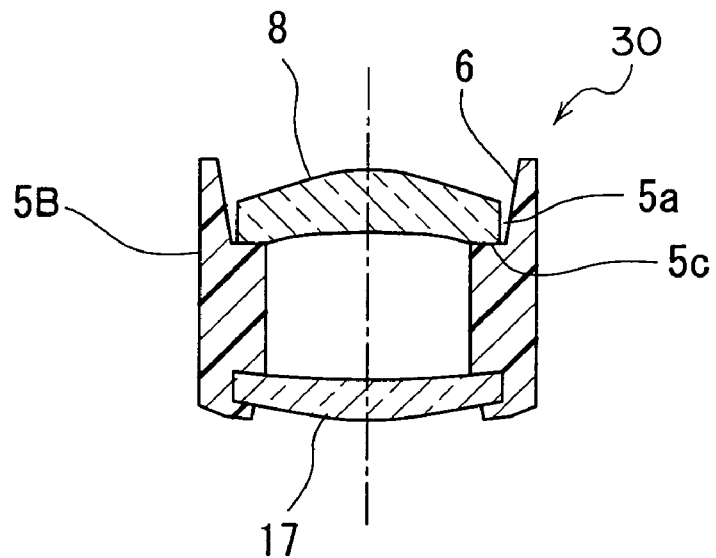
FIG. 1C is a longitudinal sectional view of an example of a housing component that is fixed by the optical component fixing apparatus of the first embodiment.
Figure 1D:
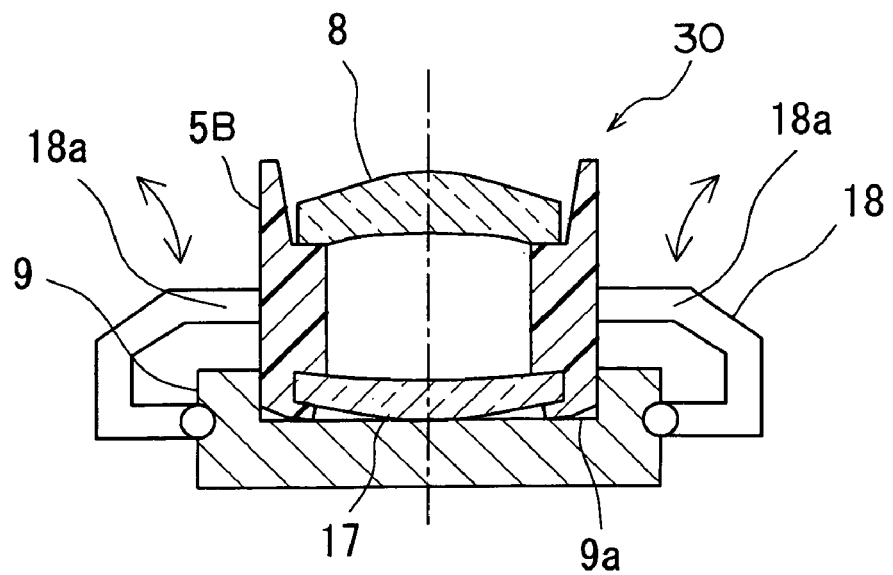
FIG. 1D is an explanatory diagram illustrating a status in which the housing component of FIG. 1C is held through a chuck mechanism by a holding member in the first embodiment.

In FIG. 1C and FIG. 1D, a lens unit 30 for a digital camera is shown as a specific example of the housing component 5. Herein will be described the lens unit 30 in which a lens 17 is fixed by crimping to a lower part of the cylindrical housing component 5B and in which the convex lens 8 is subjected to positional adjustment (with an accuracy within ±1 μm, in practice) so as to be coaxial with respect to an optical axis of the lens 17 and is fixed by the laser 11 to an upper part of the cylindrical housing component 5B.

Initially, the housing component 5B is fit into and fixed to the holding member 9. Then the convex lens 8 is fit into the inner wall 6 of the housing component 5B with positional adjustment (with an accuracy within ±1 μm, in practice) by which the optical axis of the convex lens 8 is made coaxial with respect to the optical axis of the lens 17.

Subsequently, the laser 11 is emitted from the laser source 3 in the laser radiation device 1 that is being turned by the driving device 4a of the irradiated position moving device 4, and the laser 11 having passed through the focusing optical system 2 is cast onto the whole circumference of the inner wall 6 of the housing component 5B. Concurrently, air as an example of the gas is blown at the total flow rate of 50 liters per minute, directly against the whole circumference of the inner wall 6 of the housing component 5B from the ring-like gas jet nozzle 51 of the nozzle unit 50 of the gas jet device 49.

Figure 2B:
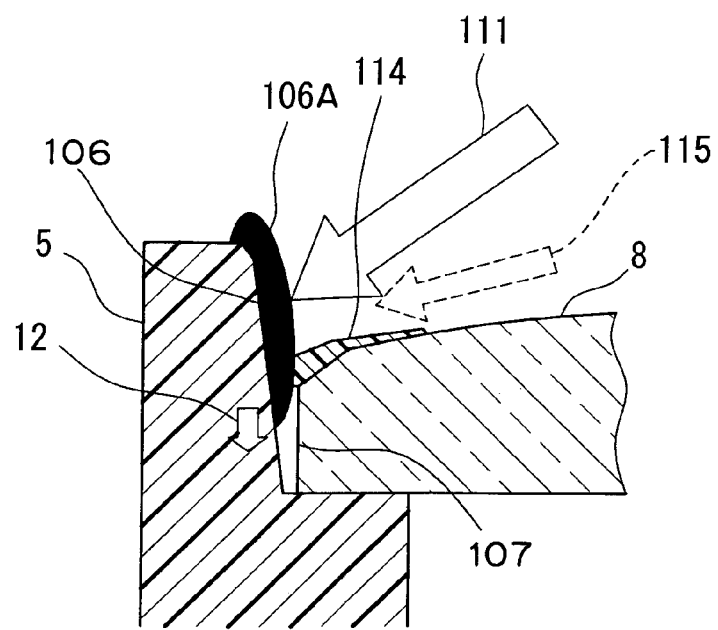
FIG. 2B is a sectional view for explaining a conventional method of fixing an optical component to an inner wall of a housing component.
Figure 2C:
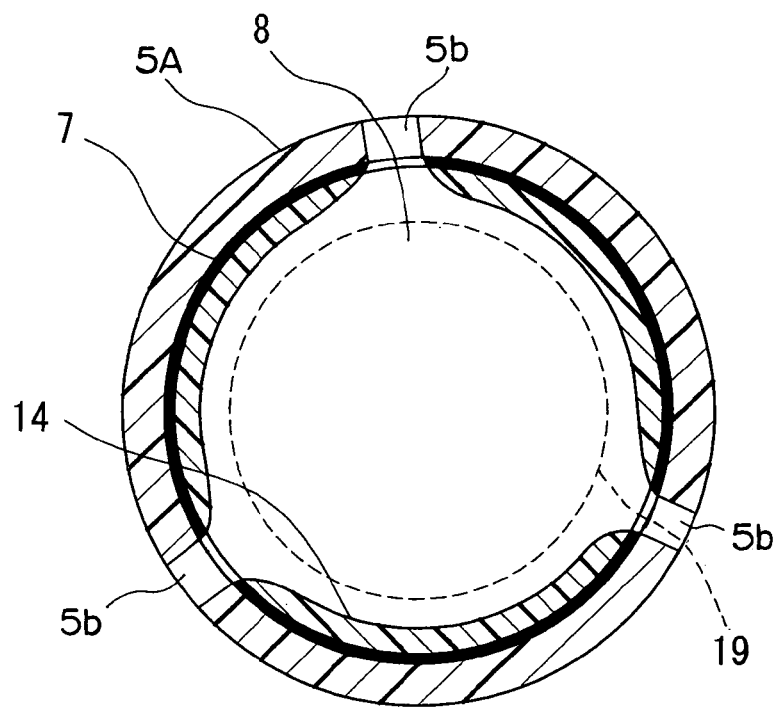
FIG. 2C is a plan view partly in section illustrating a status in which an optical component is fixed to an inner wall of the housing component of FIG. 6 which wall is partitioned into three parts, by the laser joining method of FIG. 2A in accordance with the first embodiment.
Figure 2D:
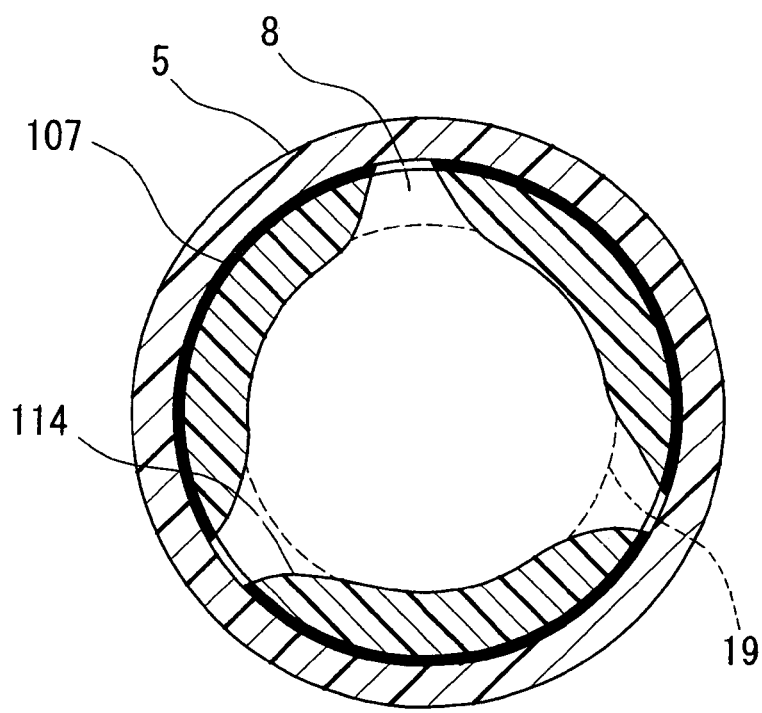
FIG. 2D is a plan view partly in section illustrating a status in which an optical component is fixed to an inner wall of a housing component by the conventional method of FIG. 2B.
Figure 2E:
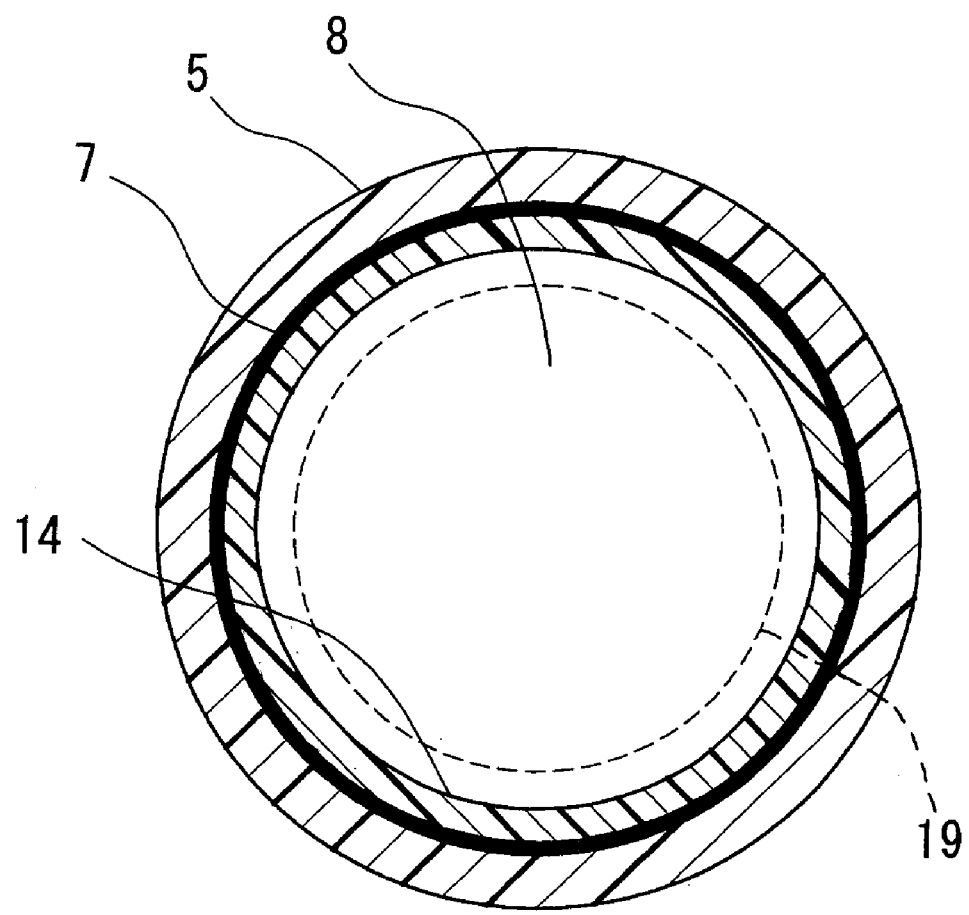
FIG. 2E is a plan view partly in section illustrating a status in which an optical component is fixed to an inner wall of the housing component of FIG. 1C by the laser joining method of FIG. 2A in accordance with the first embodiment.
Figure 6:
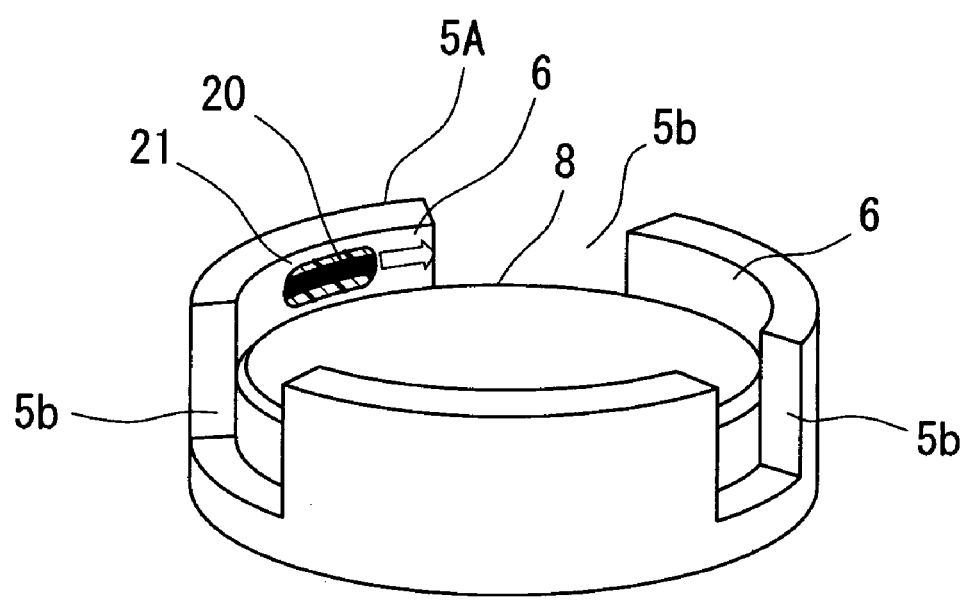
FIG. 6 is a perspective view illustrating a status in which an optical component is fixed to a housing component having an inner wall partitioned into three parts, by a laser joining apparatus and method in accordance with a modification of the first embodiment of the present invention.

As shown in FIG. 2A and FIG. 2C (wherein a housing component of FIG. 2C is a housing component 5A having the inner wall 6 partitioned into three parts as shown in FIG. 6) and FIG. 2E (wherein a housing component of FIG. 2E is the housing component 5 or 5B (denoted by "5" representatively in FIG. 2E) that has the cylindrical inner wall 6 throughout the whole circumference without partition into three parts, as shown in FIG. 1C), the laser irradiated part 20 of the inner wall 6 of the housing component 5A, 5B on which the laser 11 is cast is heated by the cast laser 11, and resin in the laser irradiated part 20 of the inner wall 6 is softened and melted. In this process, the resin constituting the inner wall 6 is softened and melted over an area that is wider than the width where the laser beam 11 is cast, because of heat conduction. FIG. 6 is a schematic view illustrating the manner in which a laser line beam as the laser beam 11 is cast on the inner wall 6 partitioned into three parts. The laser line beam having a width of 300 μm is cast on the laser irradiated part 20 of the inner wall 6. The resin of the inner wall 6 is melted over surroundings 23 of the laser irradiated part 20, and the whole area of the inner wall 6 is melted by movement of the laser irradiated part 20 along the inner wall 6 in a direction indicated by an arrow in FIG. 6. In FIG. 6, the housing component 5A in which cutouts 5b for insertion of lens position adjustment chucks 21 are formed at intervals of 120 degrees and in which the inner wall 6 is partitioned into three parts is shown as another example of the housing component 5, instead of the housing component having the inner wall 6 being continuous through the whole circumference. FIG. 1E and FIG. 1F are an explanatory view partly in section and a plan view illustrating status in which the housing component 5A of FIG. 6 is held in the holding member 9 by the three hooks 18a of the chuck mechanism 18 and in which the position of the convex lens 8 in the housing component 5A has been adjusted by the three lens position adjustment chucks 21 having tip contact parts inserted into the housing component 5A through the three cutouts 5b of the housing component 5A. In FIG. 1E and FIG. 1F, as described above, the convex lens 8 is held with the tip contact parts of the lens position adjustment chucks 21 inserted into the three cutouts 5b of the inner wall 6 and brought into contact with the side surface of the convex lens 8, and the three lens position adjustment chucks 21 can be moved in xy directions by an xy direction moving device 21 so that the position of the convex lens 8 in xy directions can be adjusted relative to the housing component 5A. By drive of the xy direction moving device 21, therefore, the position of the convex lens 8 held by the three lens position adjustment chucks 21 can be adjusted into any position in xy directions relative to the housing component 5A. In an example of FIG. 6, the whole area of the inner walls 6 can be melted by movement of the laser irradiated part 20 along the inner wall 6 in the direction of the arrow from left ends through right ends of the three inner walls 6.

Subsequently, the softened and melted resin of the inner wall 6 starts to decompose locally. A downward reaction force 12 (see FIG. 2A) caused in the process of the decomposition is exerted, as a force in a direction of the action of gravity, on resin that is in the viscous fluid state in the inner wall 6 of the housing component 5A, 5B. Accordingly, the resin that is in the viscous fluid state throughout the whole circumference of the inner wall 6 is forced into a ring-like gap 7 of tens of micrometers (μm) between the convex lens 8 and the inner wall 6 of the housing component 5A, 5B. As a result, the convex lens 8 is fixed to the housing component 5A, 5B. An accuracy of the fixation is on the order of ±3 μm (as high as a fixation accuracy in the conventional fixation method with ultraviolet curable adhesive, while a fixation accuracy in crimping is not smaller than ±10 μm).

In this process, air 15 jetted from the ring-like jet nozzle 51 of the nozzle unit 50 is blown directly against the laser irradiated part 20, and air 15 is made to flow from an upside to a downside on the inner wall 6 as shown in FIG. 2A. Thus, resin 6A in the viscous fluid state is restrained from flowing to the upside of the inner wall 6, and is thereby efficiently forced into the gap 7 between the convex lens 8 and the inner wall 6 of the housing component 5A, 5B. Consequently, the melted resin 6A in the viscous fluid state is prevented from being lifted up to the upside of the inner wall 6, the swelling that may cause defectiveness of interference with other components is reduced, and reduction in cost and improvement in productivity are attained.

On a surface of the convex lens 8 is a slight amount of resin 14 that has flowed onto a circumferential portion of the surface of the convex lens 8 instead of being forced into the gap 7 between the convex lens 8 and the inner wall 6 of the housing component 5A, 5B. Defectiveness would occur on the condition that the resin 14, which is in the viscous fluid state and which flows onto the circumference of the surface of the convex lens 8, flowed into an effective diameter 19 of the convex lens 8 (see a conventional example of FIG. 2D).

The resin 14 that flows onto the surface of the convex lens 8, however, is forced in a direction toward the inner wall 6 by the air 15 blown from the nozzle unit 50 and is thus prevented from reaching the effective diameter 19 of the convex lens 8 (see FIGS. 2A, 2C, and 2E). With the use of the housing component 5, 5B having the cylindrical inner wall 6 as shown in FIG. 2E, particularly, the resin 14 that flows onto the surface of the convex lens 8 is formed like a continuous ring having generally uniform widths throughout the whole circumference of the inner wall 6. With the use of the housing component 5A having the inner wall 6 partitioned into three parts as shown in FIG. 2C, by contrast, the resin 14 that flows onto the surface of the convex lens 8 is formed like an interrupted ring having generally uniform widths except in the cutouts 5b and the neighborhood thereof in the inner wall 6. Additionally, adhesion of decomposed resin, dust, or the like onto the surface of the convex lens 8 can be prevented by air 15. Thus, decrease in defectiveness, low cost, and improvement in productivity are fulfilled.

In the conventional method which is the above-mentioned conventional example and in which gas is jetted downward from above the center of the convex lens 8 as shown in FIG. 2B and FIG. 2D, by contrast, melted resin 106A does not sufficiently flow into a gap 107 between the convex lens 8 and an inner wall 106 of the housing component 5 and allows resin 114 to flow along the surface of the convex lens 8. A large amount of the resin 114 thus flows onto the surface of the circumference of the convex lens 8. Air 115 flows outward on the surface of the convex lens 8, then collides with the inner wall 106 to change into upward flow along the inner wall 106, and thereby pushes up the melted resin 106A, and causes swelling of an upper surface of the housing component 5 as shown in FIG. 2B.

In the conventional example, the resin 114 that flows onto the surface of the convex lens 8 is thin and is increased in amount. On the condition that a ratio of a length of the resin flow-in to a radius of the convex lens 8 is larger than 0.25, accordingly, an amount of the resin 106A that enters the gap 107 between the convex lens 8 and the inner wall 106 of the housing component 5 is significantly decreased, and thus, fixation strength is extremely reduced.

In accordance with the first embodiment of the present invention, the irradiated position moving device 4 turns the laser radiation device 1, a position on the inner wall 6 on which the laser 11 impinges is thereby moved in the circumferential direction around the optical axis of the convex lens 8, the whole circumference of the convex lens 8 is irradiated with the laser 11 cast from the laser radiation source 3, and the fixation is carried out in several seconds throughout the whole circumference of the convex lens 8 (about 15 seconds are required in the conventional fixation method with ultraviolet curable adhesive, while four seconds are required in a specific example of the present embodiment). Consequently, traces of laser irradiation are circumferentially formed by the laser 11 on the inner wall 6 of the housing component 5A, 5B.

On the condition that there is a difference in distances from the centers to ends of the convex lenses 8 as an example of optical components according to types of machine, reduction in rising time in switching of the types and improvement in productivity can be achieved simply by provision of a plurality of types of nozzle units 50 that make distances from the inner wall 6 to the jet nozzles 51 the same.

Though air is used as an example of jet gas in the first embodiment, use of an inert gas such as nitrogen gas or argon gas provides the same effects.

Though a convex lens is used as an example of the optical component in the first embodiment, use of other lenses such as a concave lens, or other optical components such as a mirror, filter, or polarizer fulfils the same effects.

Second Embodiment

A second embodiment of the present invention is the same as the first embodiment except for the height of the nozzle unit 50 relative to the laser irradiated part 20, the diameter of the jet nozzle 51, and the total flow rate of air.

Figure 3A:
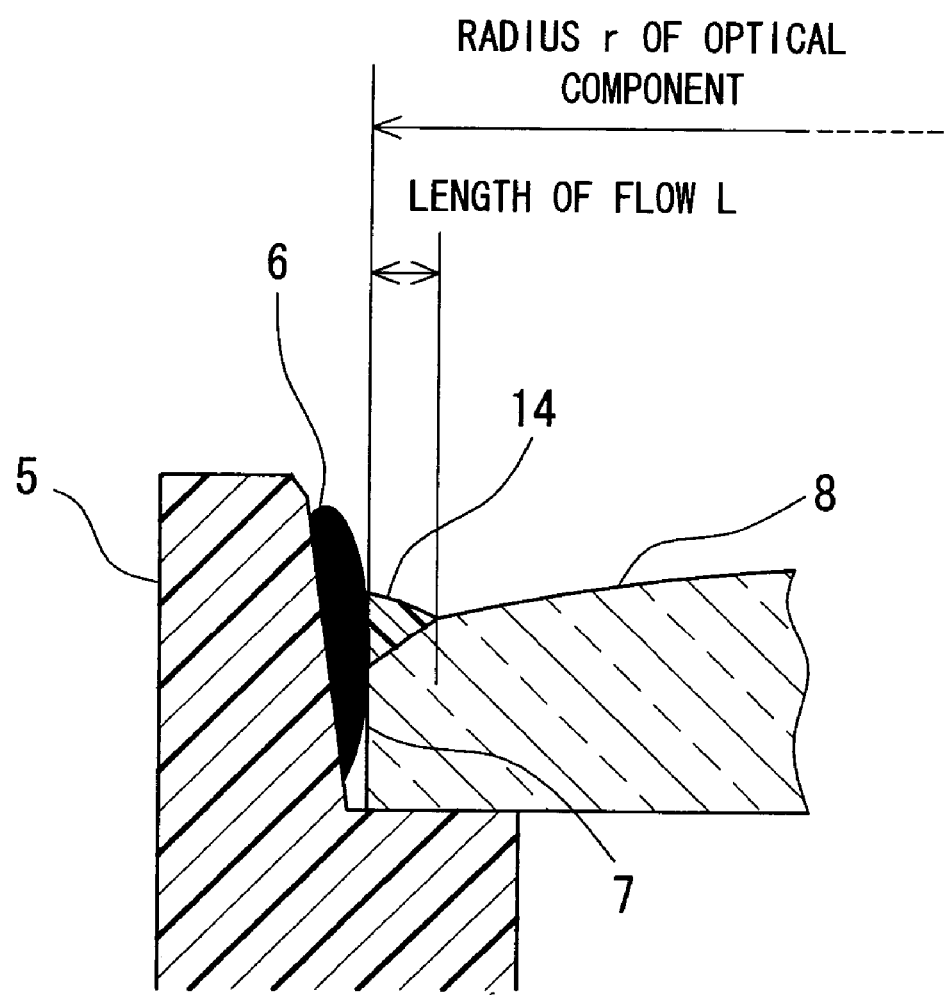
FIG. 3A is a sectional view for explaining a length of flow-in of melted resin in the first embodiment.

FIG. 3A shows the concept of a length of flow-in of the resin 14 that flows in toward the center of the optical component. A distance from an end (periphery) of the convex lens 8 to a front end of the flow-in portion is referred to as "length of resin flow-in," and the length divided by the radius of the convex lens 8 (optical component) is referred to as "ratio to radius." A table of FIG. 3B shows heights of air jetting relative to the laser irradiated part 20, diameters of the jet nozzles 51, total flow rates of air, and ratios of lengths of resin flow-in to radii of the convex lenses 8. For height of air jetting, a height at which the end of the convex lens 8 is positioned on an extension line of the nozzle unit 50 is set as datum (zero), and the heights higher than that are represented as +(plus). The table of FIG. 3B shows that a change in the height of jetting results in an increase in the length of flow-in and shows that the height lowered by 2 mm results in significantly large flow-in. This method is similar to the conventional method in which air is blown against the center of the convex lens and, as is indicated, it is difficult to restrain the length of resin flow-in unless gas is blown directly against laser irradiation.

Change in the jet nozzle diameter also results in change in the height of jetting, as is the case with the change in the height of jetting, though there is a difference in loss of flow rate. Decrease in the jet nozzle diameter lowers the height of jetting to a position lower than the datum and increases the length of resin flow-in as is the case with above description.

An air flow rate decreased to 25 liters per minute, which is half of the reference, results in a ratio of the length of flow-in of 0.25, and influence of the air flow rate is small. An air flow rate decreased to 5 liters per minute, however, results in an increase in the length of resin flow-in.

The above indicates that the length of resin flow-in depends on the air flow rate and the position of jetting and that direct gas blow against laser irradiation is required for a decrease in the length of resin flow-in.

Though a convex lens having a diameter of 10 mm is used as the optical component in the second embodiment, use of lenses or other optical components having different diameters leads to similar results. Air flow rate, conditions of laser radiation with the use are arbitrarily set according to size, shape, or the like of the optical component, and the required strength of the fixation thereof.

Third Embodiment

Figure 4A:
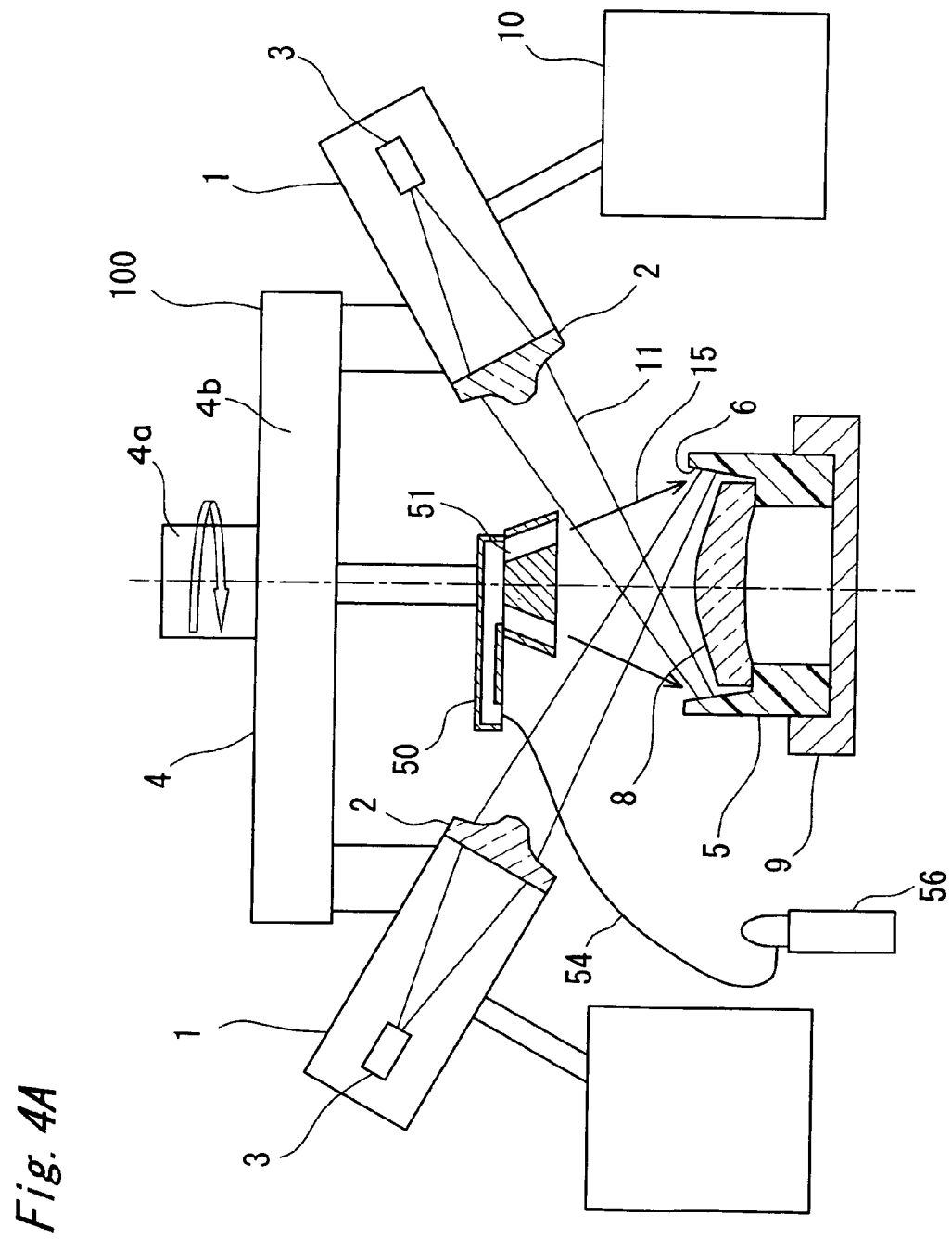
FIG. 4A is a schematic view partly in section illustrating a configuration of an optical component fixing apparatus as an example of a laser joining apparatus in accordance with a third embodiment of the present invention.
Figure 4B:
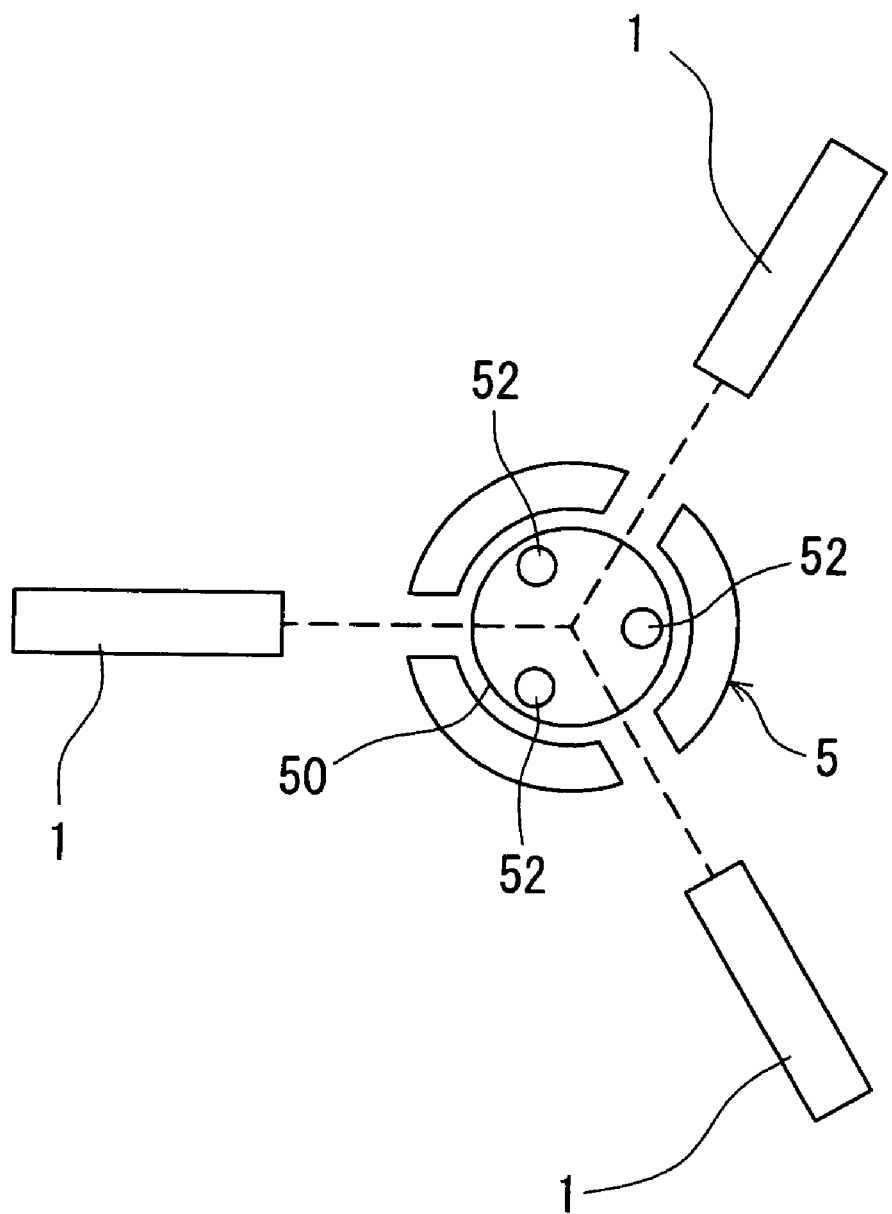
FIG. 4B is a schematic explanatory diagram illustrating a relation between a nozzle unit of a gas jet device and laser radiation devices of the optical component fixing apparatus in the third embodiment.

FIG. 4A and FIG. 4B are schematic diagrams illustrating a configuration of an optical component fixing apparatus 100 in accordance with a third embodiment of the present invention. The same elements as those of the optical component fixing apparatus 100 described with reference to FIG. 1A are designated by the same reference numerals, and detailed description of those elements will be omitted.

The optical component fixing apparatus 100 has a chuck mechanism 18, and the chuck mechanism 18 has grip means such as three hooks 18a that are placed at intervals of 120 degrees about a central axis of a housing component 5 and that hold with pressure an outer surface of a wall constituting an inner wall 6 of the housing component 5. The chuck mechanism 18 is configured so that the convex lens 8 is gripped by the three hooks 18a via the housing component 5 and so that a position of the convex lens 8 relative to the housing component 5 is adjusted with an accuracy on the order of several micrometers or higher. For the chuck mechanism 18, any device can be used as long as the device has a mechanism for gripping the convex lens 8.

Three laser radiation devices 1, each of which has a laser source 3, are placed at uniform intervals of 120 degrees about an optical axis of the convex lens 8, and a irradiated position moving device 4 simultaneously turns the laser radiation devices 1 by rotational drive of a driving device 4a such as a motor so that the laser beam 11 radiated from the laser radiation devices 1 is cast only onto two thirds of a circumference of the convex lens 8, i.e., only onto the inner wall 6 partitioned into three equal parts.

A nozzle unit 50 is configured so as to have three gas jet nozzles 52 that are directed toward three laser irradiated parts 20 and that are as many laser radiation devices 1 to be turned by the driving device 4a of the irradiated position moving device 4. The nozzle unit 50 blows air 15, at a total flow rate of 40 liters per minute, directly against the inner wall 6 while being turned at the same time as the laser radiation devices 1. For a mechanism for turning the nozzle unit 50, the mechanism may be provided by mechanical connection between the laser radiation devices 1 and the nozzle unit 50, or a nozzle unit turning drive device such as a motor provided separately from the driving device 4a of the irradiated position moving device 4 may be used so that the nozzle unit turning drive device and the driving device 4a of the irradiated position moving device 4 are synchronously turned with the use of electric synchronizing means.

Operation of the optical component fixing apparatus 100 with the above configuration will be described.

Initially, the housing component 5 is fixed to a holding member 9. Then the convex lens 8 is fit into the inner wall 6 of the housing component 5.

Subsequently, the laser beam 11 emitted from the laser sources 3 of the laser radiation devices 1 and having passed through the focusing optical systems 2 is simultaneously cast on three sites on the inner wall 6 of the housing component 5, while the laser radiation devices 1 are synchronously turned by 120 degrees by the irradiated position moving device 4. Thus two thirds of the circumference of the convex lens 8 is fixed in several seconds to the inner wall 6 partitioned into three equal parts.

In this process, the nozzle unit 50 directly blows air 15 at the total flow rate of 40 liters per minute from the three gas jet nozzles 52 directed toward the three laser irradiated parts 20 while being turned simultaneously with the laser radiation devices 1. In this manner, as is the case with the first or second embodiment, resin in the viscous fluid state is restrained from flowing to the upside of the inner wall 6, the melted resin is restrained from being lifted up to the upside of the inner wall 6, swelling of the upper surface that may cause defectiveness of interference with other components is reduced, and improvement in productivity can be attained. Furthermore, resin 14 that flows onto the surface of the convex lens 8 is forced in a direction toward the inner wall 6 by the air 15 blown from the nozzle unit 50, and is thus prevented from reaching into an effective diameter 19 of the convex lens 8. Besides, the resin is efficiently forced into a gap 7 between the convex lens 8 and the inner wall 6. Thus, the strength of fixation of the convex lens 8 is increased and adhesion of decomposed resin, dust, or the like onto the surface of the convex lens 8 can be prevented.

On the condition that there is a difference in the distance from the center to the end of the convex lens 8 according to types of machine, in the third embodiment, reduction in rising time in switching of the machine types and improvement in productivity can be achieved simply by provision of various types of nozzle units 50 that make distances from the inner wall 6 to the jet nozzles 52 the same.

Though air is used as an example of blowing gas in the third embodiment, use of another inert gas such as nitrogen or argon gas achieves the same effects.

Figure 4C:
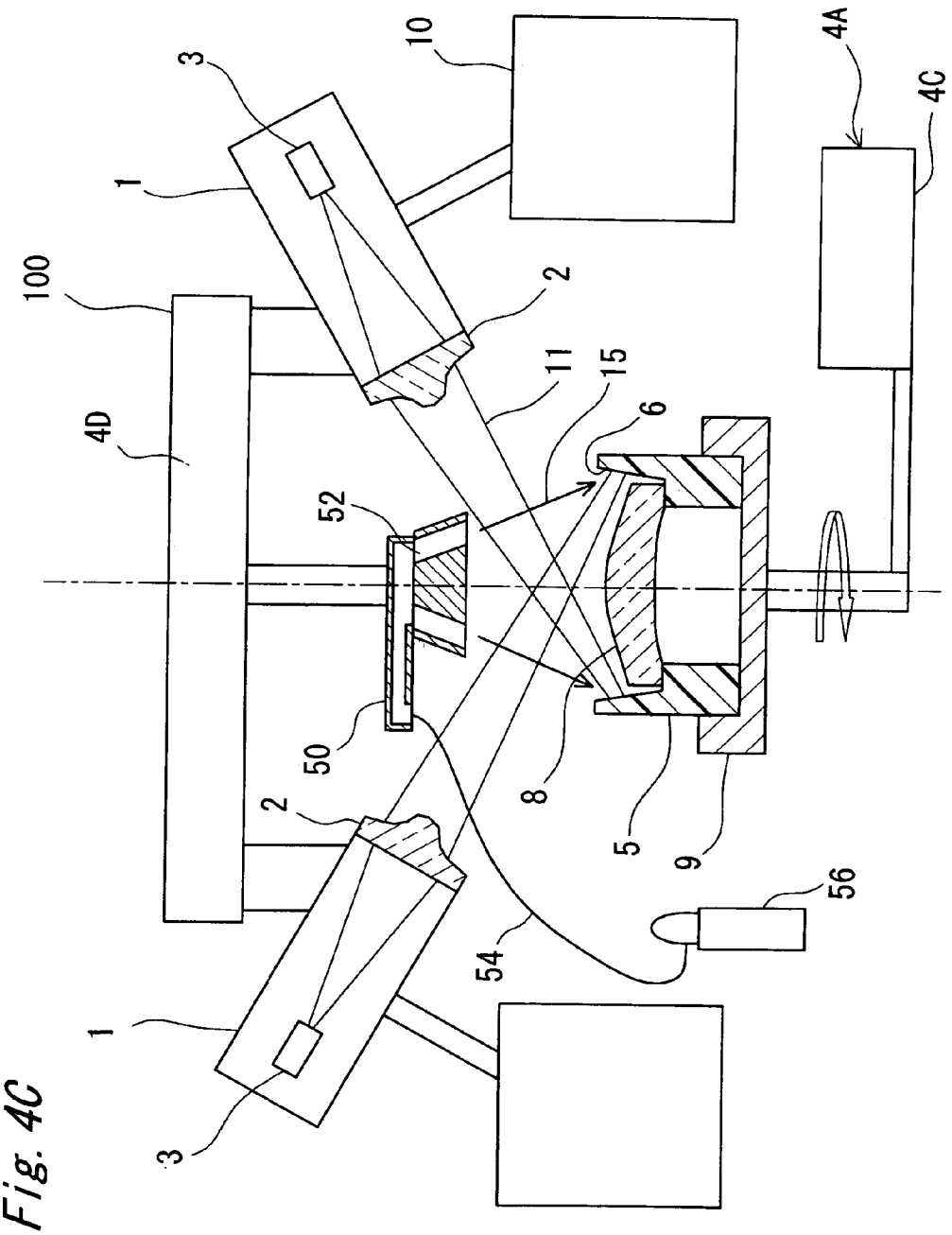
FIG. 4C is a schematic view partly in section illustrating a configuration of an optical component fixing apparatus as an example of a laser joining apparatus in accordance with a modification of the third embodiment of the present invention.

Instead of the turn of the laser radiation devices 1 and the nozzle unit 50 of the gas jet device 49, the holding member 9 and the nozzle unit 50 may be turned. FIG. 4C is a schematic diagram partly in section illustrating a configuration of an optical component fixing apparatus as an example of the laser joining apparatus in accordance with a modification of the third embodiment of the present invention. The laser radiation devices 1 are supported by a fixed support frame 4D. The holding member 9 is turned about a central axis thereof (optical axis of the convex lens 8) by a driving device 4c such as a motor of a holding member moving device 4A. Thus, the holding member 9 is turned about the central axis thereof (the optical axis of the convex lens 8) by the driving device 4c such as the motor of the holding member moving device 4A, and the laser beam 11 is cast from the three laser radiation devices 1 onto the three laser irradiated parts 20 of the housing component 5 held by the holding member 9, as in the case with the third embodiment. Concurrently, air 15 can directly be blown at the total flow rate of 40 liters per minute from the three gas jet nozzles 52 of the nozzle unit 50.

In accordance with such a configuration, the laser radiation devices 1 and the nozzle unit 50 are not required to be turned, and the turning drive mechanism can be simplified as a whole.

Fourth Embodiment

In a fourth embodiment of the present invention, as shown in FIG. 5, the laser beam 11 radiated from the laser sources 3 can be introduced through fibers 40 into the laser radiation devices 1 and can be focused by focusing optical systems 2 composed of two sets of convex lens, and the laser beam 11 focused into a beam width of 300 μm can be cast on an inner wall 6 of a housing component 5. Other configurations in this case are the same as those in the third embodiment.

For a decrease in the beam width, masks 13 having through holes for making the beam width smaller may be provided on a rear side (emission side) of the focusing optical systems 2, and the beam width may be decreased by casting of the laser beam 11 through the through holes.

In accordance with the present invention, as described above, the length of flow-in of melted resin is so small that the optical component unit, which is small in size and weight, can be provided. Furthermore, prevention of the resin flow-in into the effective diameter results in a decrease in defectiveness and cost and an improvement in productivity. Also, prevention of lift of melted resin up to the upper part of the inner wall, i.e., decrease in swelling of the upper surface allows thin optical components to be provided, elimination of defectiveness of interference with other components results in reduction in cost and improvement in productivity, and reduction in rising time in switching of the machine types and improvement in productivity allow the present invention to be applied to optical component units, a laser joining method for an optical component unit, and a laser joining apparatus for an optical component unit.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An optical component unit comprising:
   a housing component formed of resin; and
   an optical component housed along an inner wall of the housing component,
   the inner wall of the housing component having traces of laser irradiation, the traces of laser irradiation being formed from resin of the inner wall melted locally and thermally in a viscous fluid state and forced into and fixed between the optical component and the inner wall, a ratio of a length of resin flow-in from an end face of the optical component on an outer upper surface of the optical component to a radius of the optical component being larger than 0 and not larger than 0.25.

2. An optical component unit as defined in claim 1, wherein a height from a top of a wall surface of the optical component to a top of the inner wall of the housing component is not larger than 1 mm and wherein swelling of melted resin from the inner wall is not larger than 0.2 mm.

3. An optical component unit as defined in claim 1, wherein a receiving surface of the housing component for holding the optical component has no traces of melt.

4. A laser joining method for an optical component unit, the method comprising:
   casting a laser beam by a laser radiation device onto an inner wall of a housing component formed of resin, locally and thermally melting resin of a laser irradiated part into a viscous fluid state, forcing the resin in the viscous fluid state into an area between the optical component housed along the inner wall of the housing component and the inner wall;
   blowing gas, directly against the laser irradiated part, radially and diagonally downward from a position above a center of the optical component by a gas jet device; and
   cooling and solidifying the resin in the viscous fluid state forced into between the optical component and the inner wall.

5. A laser joining method for an optical component unit in which an optical component housed along an inner wall of a housing component formed of resin is fixed to the inner wall, the method comprising:
   casting onto the inner wall a laser line beam having longer sides extending in a direction along the inner wall of the housing component formed of resin, by a laser radiation device, while moving the laser line beam in the direction of the longer sides;
   locally and thermally melting resin of a laser irradiated part into the viscous fluid state; and
   forcing the resin in the viscous fluid state into an area between the optical component housed along the inner wall of the housing component and the inner wall.

6. A laser joining method for optical component unit as defined in claim 5, wherein the laser line beam cast on the inner wall has a beam width not smaller than 20 µm and not larger than 300 µm.

7. A laser joining apparatus for an optical component unit, the laser joining apparatus comprising:
   a holding member for holding a housing component that is formed of resin and houses an optical component along an inner wall;
   a laser radiation device for casting a laser beam onto the inner wall of the housing component, locally and thermally melting resin of a laser irradiated part into a viscous fluid state, and forcing the resin in the viscous fluid state into an area between the optical component and the inner wall so as to fix the optical component to the inner wall; and
   a gas jet device that is placed in a position above a center of the optical component for jetting gas radially and diagonally downward from the position above the center of the optical component, and blowing the gas directly against the laser irradiated part.

8. A laser joining apparatus for optical component unit as defined in claim 7, wherein a nozzle unit of the gas jet device has a ring-like gas jet nozzle directed toward the laser irradiated part.

9. A laser joining apparatus for optical component unit as defined in claim 7, the laser joining apparatus further comprising a plurality of the laser radiation devices,
   wherein a nozzle unit in the gas jet device has a plurality of gas jet nozzles directed toward the laser irradiated part, and the number of gas jet nozzles is as many as the laser radiation devices, and
   wherein the laser joining apparatus further comprises a turning mechanism for turning the nozzle unit simultaneously with the laser radiation devices.

10. A laser joining apparatus for an optical component unit, the laser joining apparatus comprising:
    a holding member for holding a housing component that is formed of resin and houses an optical component along an inner wall of the housing component; and
    a laser radiation device for casting onto the inner wall of the housing component, a laser line beam that has longer sides extending in a direction along the inner wall of the housing component, and the laser line beam has a beam width not smaller than 20 µm and not larger than 300 µm, wherein the laser line beam is cast while moving the laser line beam in the direction of the longer sides, locally and thermally melting resin of a laser irradiated part into a viscous fluid state, and forcing the resin in the viscous fluid state into an area between the optical component and the inner wall so as to fix the optical component to the inner wall.

11. An optical component unit as defined in claim 2, wherein a receiving surface of the housing component for holding the optical component has no traces of melt.

* * * * *